April 10, 1945.  W. H. OLSEN  2,373,258
EDUCATIONAL MAP
Filed June 26, 1941   2 Sheets-Sheet 1
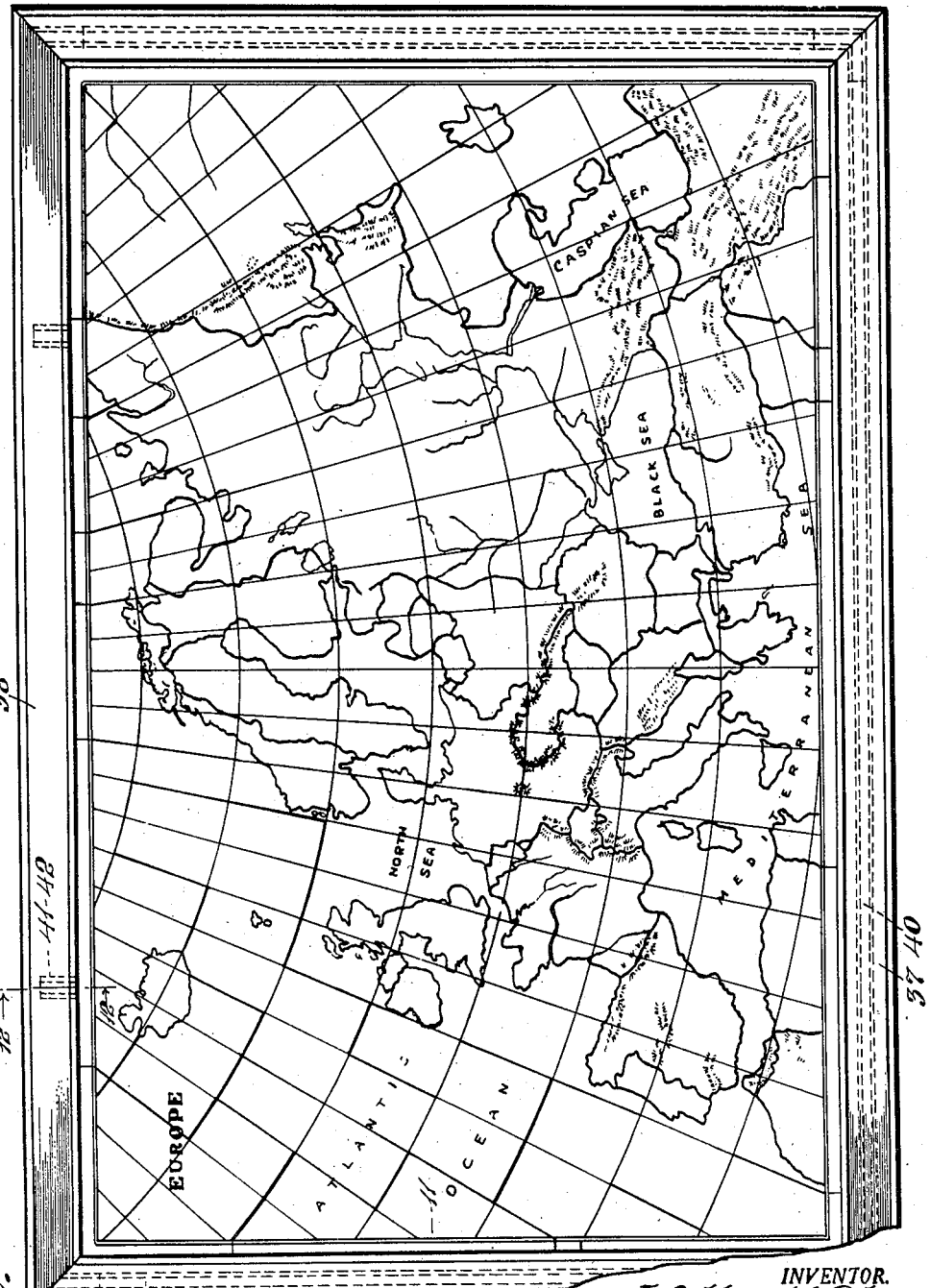

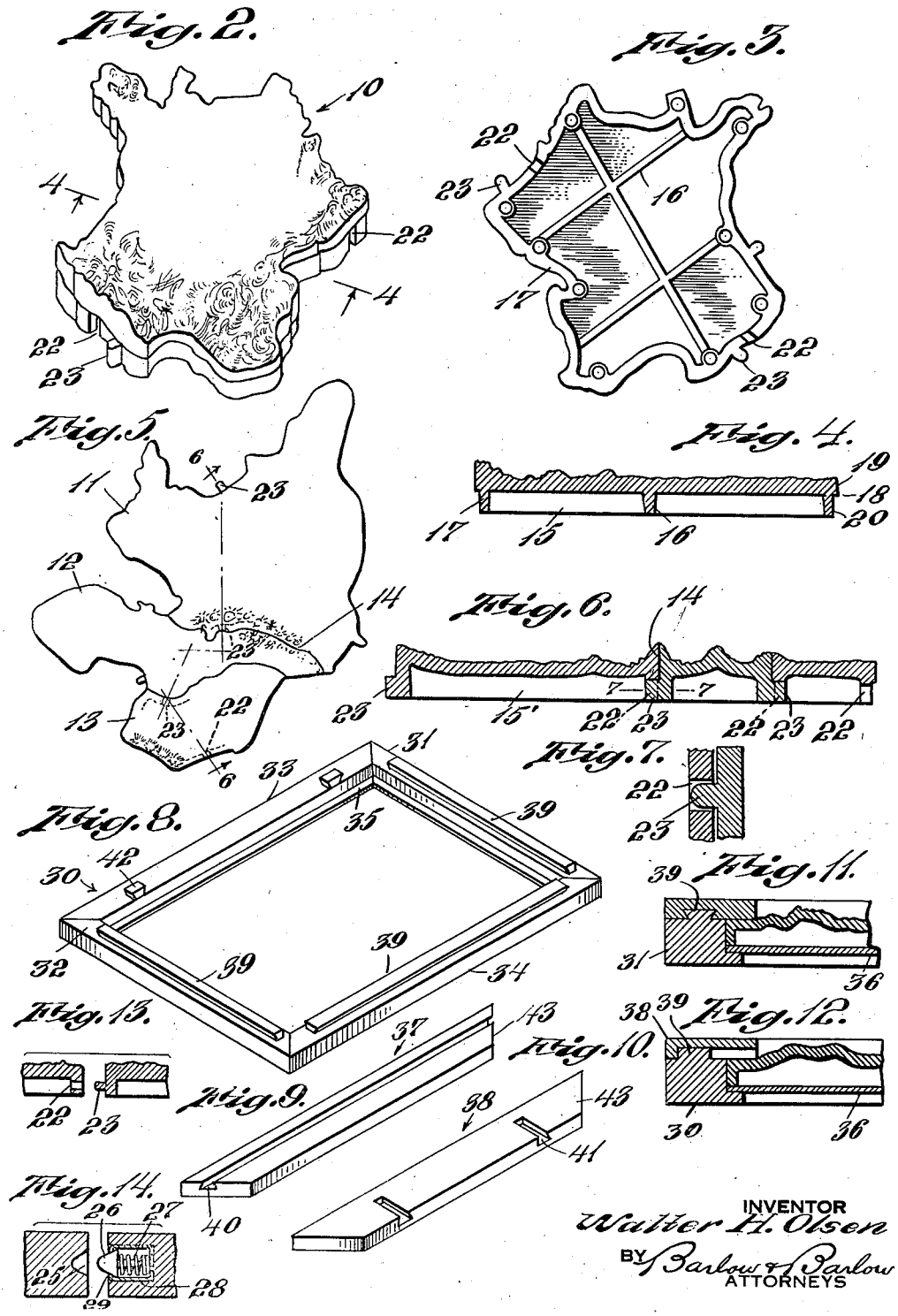

Patented Apr. 10, 1945

2,373,258

UNITED STATES PATENT OFFICE 2,373,258

EDUCATIONAL MAP

Walter H. Olsen, Providence, R. I.

Application June 26, 1941, Serial No. 399,860

3 Claims. (Cl. 35—41)

This invention relates to sectional maps, either of the relief model type or flat non-relief type, produced to exacting standards of accuracy.

The United States War Department in a manual on "Military Maps and Mapping" states, ". . . the relief model possesses advantages over all other forms of maps. . . . it has the disadvantage of being bulky and difficult to transport and its reproduction in quantity is, in spite of all efforts, a slow process, so that its use is limited to the headquarters of the higher commands."

One of the primary objects of this invention is to overcome the objections cited above. This is accomplished by making the models in sections and mechanically reproducing those sections, preferably in synthetic resins, rapidly and in quantity.

Another of its objects is to provide a map in sections, each in miniature corresponding in size and outline to the state or country portrayed, so that in the event of changes in political boundaries new sections, embodying the revised boundaries, may be substituted, thus enabling one to have an up-to-date map at all times.

Another object of the invention is to provide a sectional map that reveals, through vertical relief, mountains, valleys, rivers and other physical characteristics of the countries represented, so that by superimposing one section upon another or placing one alongside another the observer will gain a vivid impression of the relative size of countries, height of mountains, breadth or valleys, etc.

Another object of the invention is to provide an interlocking between the sections which are provided so that the map, even though it be of sections, may be hung on a wall and said sections will resist dislodging by the mischievous or curious.

Another object of the invention is to provide a frame to assist in holding the sections in place after the same are assembled.

Still another object of the invention is to promote the extensive use of relief models by producing light-weight, indestructible, topographically-accurate models at a fraction of their former cost. Heretofore cost put relief models beyond the reach of any but the largest institutions, while size, weight, fragility further restricted their use.

With these and other objects in view, the invention consists of certain novel features of construction, as will be more fully described, and particularly pointed out in the appended claims.

In the accompanying drawings:

Fig. 1 is a plan view of the framed sectional map which is the subject of this invention;

Fig. 2 is a perspective view of one of the sections;

Fig. 3 is a bottom plan view of the section shown in Fig. 2;

Fig. 4 is a section on line 4—4 of Fig. 2;

Fig. 5 is a plan view of a few of the sections in their assembled relation;

Fig. 6 is a section on line 6—6 of Fig. 5;

Fig. 7 is a section on line 7—7 of Fig. 6;

Fig. 8 is a perspective view of the frame in which the sections are assembled, with some of the parts removed;

Fig. 9 is a perspective view of part of the frame not present in Fig. 8;

Fig. 10 is a perspective view of part of the frame absent in Fig. 8;

Fig. 11 is a section on line 11—11 of Fig. 1;

Fig. 12 is a section on substantially line 12—12 of Fig. 1;

Fig. 13 is a sectional view of a modified arrangement of locking means;

Fig. 14 is a sectional view of a still different modification of locking means.

While many types of relief models have been patented down through the years, only two parts have proved to be marketable or commercially practicable; one is the conventional plaster of Paris model; the other is the embossed paper model. The former were always very costly, massive and heavy, while the latter were necessarily "generalized" to a degree that their use was limited mostly to elementary schools. To overcome the objections to weight, mass, cost and excessive "generalization," I have devised a light-weight, indestructible, topographically-accurate model that, by virtue of its being sectionalized, can be mechanically produced at moderate cost.

Moreover, in Europe many national boundaries have been changed recently, making obsolete all maps of the continent. Fearing other far-reaching changes may be imminent, map makers generally are reluctant to manufacture maps embodying the present boundaries lest they, too, become obsolete shortly. Purchasers likewise are reluctant to buy. To satisfy the need for a map, particularly of the relief model type, that may always be kept up to date at small expense, I have arranged to provide a map in which each country, state or political subdivision will be represented by a section whose size and contour will correspond with, and in fact be a miniature of, the state or country represented so that, in the event other boundary revisions occur, one need purchase new sections only of the countries or states whose boundaries have been altered, and by inserting these in place of the obsolete sections one always will have an up-to-date map.

Sectional maps of this character require certain holding means to retain them in assembled position, and I have provided certain interfitting recesses and projections in a desired relationship and retained these sections in a framework which will enable the map to be hung upon a wall. In addition, the interfitting recesses and projections will facilitate assembling and movement of the assembled map when not framed, as anyone having experience with jig-saw puzzles will readily appreciate. Further, these sections have been made of such a character they may be molded or otherwise formed of any material that lends itself to mechanical molding, or more preferably one that does not require subsequent finishing, such as sand blasting. By using organic plastics the sections may be molded in colors or not, in a single operation, in one piece with interfitting recesses and projections and the physical characteristics of the country (mountains, valleys, rivers) molded integrally, the latter in actual relief to scale. The following is a more detailed description of the present embodiment of this invention, illustrating the preferred means by which these advantageous results may be accomplished.

With reference to the drawings, Fig. 1 represents the map of Europe formed in a multiplicity of sections molded along the true political boundaries of the component nations. These sections are designated generally 10 and may consist of such grouping of sections as may be seen in Fig. 5 at 11, 12 and 13, which, for illustrative purposes, represent the areas which used to be Poland, Czechoslovakia and Hungary. These sections may be molded of an organic plastic, preferably in contrasting colors, and will vary in height as the topography of the countries represented varies. For instance, the section 11 of Poland will have along its boundary 14 the likeness of mountains projecting upwardly, as perhaps may be best illustrated in Fig. 6, unless of course the map be of the flat, non-relief type, in which case the mountains may be otherwise indicated.

The sections may be molded with a hollow recess as at 15 (see Figs. 3 and 4); or, in the case of large maps, the hollow recess preferably will conform roughly with the external configurations of the section as shown at 15' with the undersurface generally conforming to the face (see Fig. 6) in order to produce a fairly uniform thickness of wall. As is well known, organic plastics have a marked tendency to warp whenever there is wide variation in the thickness of parts of the molded article, as the greater mass at one point, requiring more time to cool, sets up stresses that cause warping. Warping of the sections of a sectionalized relief model obviously would distort elevations and thus render the map worthless. Accordingly, some shaping of the undersurface as shown will provide the uniformity of thickness necessary to cover such warping.

To further prevent any tendency to warp, the sections will be reinforced on the underside with ribs as shown at 16 which tie into the peripheral flange 17, being one piece of material therewith, so that ribs and flange co-operate in producing rigidity of the section. The pattern of reinforcing each section necessarily will vary with the size and shape of the section.

In molding the sections, I provide a two-part mold which separates at substantially line 18, as seen in Fig. 4, there being a taper 19 on the upper part of the section for ejection from the mold and also a taper 20 on the flange and lower part of the section and its ribs such as 16, both of which extend inwardly as they progress from the center line 18, as shown in greatly exaggerated form in Fig. 4, so as to permit rapid mechanical ejection of the sections from the mold.

There will be provided on the edges of the sections at certain desirable locations chosen for the most effective assembling and locking interlocking recesses 22 and projections 23, shown along the stiffening flanges and molded integrally therewith, as shown in Figs. 3, 4, and 13; or, there may be recesses 25, as in Fig. 14, and a resilient pin pressed outwardly by spring 27 contained by housing 28 and limited by flanges 29 of the housing in its outward movement.

The recesses 22 extend completely through the flange 17 on the edge of the sections and thus provide for any clearance of foreign matter which may lodge in the recesses. The projections 23 are of a size to loosely fit the recesses but prevent any upward movement of the sections at right angles to the face of the map. It thus is necessary in assembling the map to assemble the map from the center outwardly toward the edges in order that the interlocking projections and recesses may be properly positioned. When the map is placed in the frame, there will be no possibility of its being disassembled. In the showing in Fig. 14, however, with the resilient pin 26, the sections may be snapped in position or pulled from position by a sufficient force to compress the pin due to the tapering of its end portion.

In order to hold these sections in assembled relation so that the may may be readily handled and hung on a wall, I provide a frame designated generally 30 which consists of opposite sides 31 and 32 and 33 and 34, all recessed as at 35 to receive within them a backing-up plate 36, and on this backing-up plate the sections, designated generally 10, are assembled. The depth of recess 35 is such that the thickness of the sections at their edges will be substantially the same as the depth of this recess so that the locking portion of the frame which consists of three members substantially as shown at 37 in Fig. 9 and member 38 shown in Fig. 10 may be assembled in position.

A dove-tailed projection 39 exists upon the sides 31, 32 and 34, while a dove-tailed groove 40 is provided in the members 37 so that each one of these three sections may be slid upon these dove-tailed projections and there be retained in a position to overhang the sections of the map 10, as shown in Fig. 11. The fourth member 38 is positioned by sliding its dove-tailed groove 41 over the dove-tailed projection 42 which extends laterally instead of longitudinally of the strip 33; and thus by means of mitred corners 43 the various members 37, 38 which have been slid into position will be held in place. Some locking of the member 38 in position may be provided, but as this will be at the top of the frame, its weight in most instances will be sufficient.

It is apparent that the sections may be made in varying colors or tints. In fact one of the primary purposes of sectionalizing along political boundaries is to make possible the imparting of a distinguishing color to each country or state during the molding of the section. If Europe or the United States were to be molded in a single section, to show the various countries or states in contrasting colors, as is customary, would necessitate hand painting the boundaries first and then hand coloring the map. The same would be true if any continent were sectionalized along arbitrary lines, as certain sections then would embrace more than one state or country and several contrasting colors could not be imparted to the sections during manufacture.

From the above it will be seen that section 11 representing Poland might be yellow; section 12 representing Czechoslovakia might be blue; section 13 representing Hungary, red; and Germany, green. When Czechoslovakia was taken over by Germany, the blue section 12 might have been removed from the map, and an identically molded section supplied by the maker of the map, colored green to match Germany, might be substituted therefor. Or, if it so happened that but a part of the country, such for instance as the Sudeten area, were taken over by Germany, the section 12 could be removed and two new sections, one corresponding to the section 12 except for the Sudeten area, of blue, be substituted. Or, a new section of Germany with the Sudeten area annexed might be substituted. To do this, it would be necessary merely to remove the holding strips 38 and 37 from the framework, lift out the backing plate 36, laterally move enough of the sections to withdraw the sections such as 13 and 12, to then substitute the new sections and replace the backing plate within the frame. In some cases, where the resilient type of holding device as shown in Fig. 14 is used, the sections might be snapped into place without any lateral spreading of the surrounding sections.

This case is a continuation in part of my copending application, Serial No. 289,526, filed August 11, 1939.

I claim:

1. A map formed in a plurality of sections each representing a state, country, or political subdivision and having an outline corresponding to the boundary thereof, the sections being closely fitted together, a plurality of locking means to hold said sections together for group movement, said locking means being located at two points along the borders of each of said sections with substantial portions of the section lying between said points.

2. A map formed in a plurality of sections each representing a state, country, political or geographical subdivision and having an outline corresponding to the boundary thereof and contours corresponding to the geomorphic structure of the region represented, the sections being closely fitted together, a frame about said sections to hold said sections against spreading, a plurality of locking means to hold said sections together, said locking means being located at two points along the borders of each of said sections with substantial portions of the section lying between said points.

3. A map formed in a plurality of sections each representing a state, country, political or geographical subdivision and having an outline corresponding to the boundary thereof and contours corresponding to the geomorphic structure of the region represented, the sections being closely fitted together, a frame about said sections with portions extending over the marginal edges of the assembled sections and along the edges of said assembled sections to hold said sections against spreading or the peripheral edges of said assembled sections against movement at right angles to such spreading movement, a plurality of locking means to hold said sections together, said locking means being located at two points along the borders of each of said sections with substantial portions of the section lying between said points.

WALTER H. OLSEN.